United States Patent Office 3,432,530
Patented Mar. 11, 1969

3,432,530
π-ALLYL TRANSITION METAL COMPOUNDS
Günther Wilke Mulheim (Ruhr), Germany, assignor to Studiengesellschaft Kohle m.b.H., Mulheim (Ruhr), Germany
No Drawing. Continuation-in-part of applications Ser. No. 272,881, Apr. 15, 1963, and Ser. No. 387,990, Aug. 6, 1964, and division and a continuation-in-part of application Ser. No. 387,826, Aug. 6, 1964, now Patent No. 3,379,706, dated Apr. 23, 1968. This application Aug. 25, 1967, Ser. No. 663,229
Claims priority, application Germany, Apr. 18, 1962, St 19,116; Aug 10, 1963, St 20,974, St 20,975, St 20,976
U.S. Cl. 260—429   20 Claims
Int. Cl. C07f 7/00, 9/00, 15/04

ABSTRACT OF THE DISCLOSURE

Production of π-allyl transition metal compounds by the reaction of a water-free transition metal compound with an allyl compound of a metal of Groups Ia, IIa, IIb, or IIIa of the Periodic System under substantially anhydrous conditions at a temperature of about —100 to +100° C., in the presence of a protective gas and carbonyl-free π-allyl transition-metal products produced thereby. The resulting compounds have utility as catalysts for reactions of unsaturated hydrocarbons.

This application is a continuation-in-part of application Ser. No. 272,881, filed Apr. 15, 1963, now abandoned; application Ser. No. 387,990, filed Aug. 6, 1964; and a division and a continuation-in-part of application Ser. No. 387,826, filed Aug. 6, 1964, now Patent No. 3,379,706, issued Apr. 23, 1968.

This invention relates to the production of π-allyl transition metal compounds. It more particularly refers to a novel method of producing such compounds as well as to the compounds so produced and derivatives thereof.

This specification discloses a novel group of π-allyl compounds which are free of other ligands and have a metal constituent of Groups IVb, Vb, VIb and VIII of the Periodic Table. It is further disclosed in this specification a process for producing these novel compounds by reacting a water-free transition metal compound with an allyl compound of a metal of Groups Ia, IIa, IIb and IIIa at a temperature of about —100° C. to 100° C. under an inert gas. The allyl group may suitably be a straight chain or a cyclic compound having 3 carbon atoms in a plane containing allylic unsaturation distributed amongst these 3 carbon atoms. The compounds of this invention may also exist in the form of a salt with substantially any appropriate anion. The compounds and salts of this invention have utility as catalysts for the cyclooligomerization of mono- and diolefins. Specifically, exemplary compounds produced by the practice of this invention include tris-(π-allyl)-chromium, π-allyl palladium chloride, π-cyclooctatrienyl-nickel-acetate and adduct of π-allyl-nickel-iodide and triphenylphosphine.

The compounds of this invention are π-allyl or substituted allyl transition metal compounds, their salts and their adducts with various Lewis acids or bases. These compounds salts and/or complexes are free from other ligands than these specified.

π-Allyl transition metal compounds were first made in 1959 by Smidt and Hafner, see Angewandte Chemie 71,284 (1959). Further allyl metal compounds have been made by H. B. Jonassen, J. Amer. Chem. Soc. 80, 2586 (1958); R. Huttel u.J. Kratzer, Angew, Chem. 71,456 (1959); I. I. Moiseev, E. A. Fedorowskaya u. Y. K. Syrkin, J. anorg. Chem. (Russ.) 4, 2641 (1959). These products generally contained additional ligands besides the π-allyl group therein.

Wilke and Bogdanovic showed, in Angewandte Chemie, vol. 73 (1961), p. 756, that it is possible to produce carbonyl-free bis-π-allyl nickel by the reaction of anhydrous nickel bromide and allyl magnesium chloride. Thus, for the first time there was prepared a π-allyl transition metal compound containing no other ligands than π-allyl groups.

It is an object of this invention to provide an improved process for preparing π-allyl transition metal compounds.

It is another object of this invention to provide improved processes for preparing novel derivatives of π-allyl transition metal compounds.

It is a further object of this invention to provide a novel series of carbonyl-free π-allyl transition metal compounds.

It is a still further object of this invention to provide novel derivatives of π-allyl transition metal compounds.

Other and additional objects of this invention will become apparent from a consideration of this entire specification, including the claims appended hereto.

In accord with and fulfilling these objects, one aspect of this invention resides in the discovery that π-allyl transition metal compounds containing no other ligands than π-allyl groups can be manufactured in commercial quantities and of a purity sufficient for the intended use, described below, by the reaction of a water-free compound of a transition metal of Groups IVb, Vb, VIb or VIII of the Periodic Table with an allyl compound of a second, non-transition metal of Groups Ia, IIa, IIb, or IIIa, provided that the reaction is carried out in the substantial absence of water and under a substantially inert gas blanket.

As used herein, the Periodic Table referred to is that which is used by the International Union of Pure and Applied Chemistry.

The π-allyl transition metal compounds produced by the process of this invention show utility as catalysts for the cyclooligomerization of 1,3-diolefins, particularly butadiene, to produce cyclododecatriene.

π-Allyl transition metal compounds produced according to the practice of this invention correspond to the general formula:

(I)

wherein $R_1$ to $R_5$ may in general be any organic radical or hydrogen. It may also be that the "allyl" group may be part of a closed ring ssytem, in which case $R_1$ and $R_4$ will together form a divalent organic bridging radical such as, for example, an alkylene group. Me is any of the transition metals generally described above and $n$ is an integer of 1 to 4.

In particular, the $R_1$ to $R_5$ groups are suitably hydrogen, alkyl, cycloalkyl, aralkyl, aryl, alkylene (in the case of the allyl group being part of a closed ring system) or cycloalkylene (in the case of the allyl group being part of a closed bicyclo ring system). Exemplary of the substituent groups $R_1$ through $R_5$ set forth above, there are methyl, ethyl, propyl, butyl, 2-ethylhexyl, nonyl, dodecyl, octadecyl, cyclopentyl, cyclohexyl, cyclooctyl, cyclododecyl, phenyl, tolyl, naphthyl and t-butyl phenyl. It is within the scope of this invention that the terminal carbon atoms of the allyl group may be joined by a bridging divalent aliphatic hydrocarbon such as, for example, an alkylene or alkenylene group to form a saturated or unsaturated ring compound containing at least one planar allyl grouping therein. This ring compound may itself be substituted as, for example, by one or more lower alkyl groups having up to about 6 carbon atoms in normal or isomeric configuration. Where a ring containing allyl moiety is utilized in the practice of this invention, such ring may contain between about 3 to 12 carbon atoms therein and may, in addition, as set forth above, have one or more alkyl substituents thereon.

The transition metals generally described above are exemplified by titanium, vanadium, chromium, iron, cobalt, zirconium, niobium, molybdenum, palladium, tantalum, platinum, tungsten, thorium and nickel.

It has been discovered that the substituted allyl radicals, e.g., crotyl, methallyl, cyclooctenyl, etc., form much more stable $\pi$-allyl transition metal compounds than unsubstituted allyl, i.e., where $R_1$ to $R_5$ are all hydrogen. It is therefore preferred, particularly in the case of nickel compounds, to provide at least one of the $R_1$ to $R_5$ substituents as a hydrocarbon.

As noted above, one of the reactants used to produce $\pi$-allyl transition metal compounds according to this invention is an organometallic moiety. It is particularly preferred in the practice of this invention that the metal moiety of this organometallic compound be chosen from Groups I$a$, II$a$, II$b$ and III$a$ metals. Of particular interest are the alkali metals, alkaline earth metals, boron, aluminum, mercury and zinc. The alkali metals are exemplified by sodium, potassium and lithium. The alkaline earth metals are exemplified by magnesium, calcium, beryllium, strontium, and barium.

The reaction according to the present invention is preferably carried out in a liquid reaction medium which is inert towards both the starting materials and the reaction products. Solvents which show some solvent power for the reaction components may be used to advantage, aliphatic, cyclic or aromatic ethers being especially preferred.

Likewise, there may be used to advantage transition metal compounds which are at least slightly soluble in the reaction medium, even though solubility may be quite low. The halides or acetylacetonates of transition metals have, for example, proved particularly successful, but other compounds can also be employed. Particularly suitable as organo-metallic components for introducing the aforesaid allyl-radical are compounds of alkali and alkaline earth metals, but the corresponding compounds of zinc or mercury or boron or aluminum can also be employed.

The organo-compounds of the above elements are obtained by known methods; in the simplest case, for example, allyl magnesium chloride is obtained by allyl chloride and magnesium. It has, however, been found that in many cases it is unnecessary to produce the organo-metal compound separately before the reaction with the transition metal compounds; thus, the desired reaction also succeeds if, for example, crotyl chloride is reacted in the presence of the transition metal compounds with, for example, magnesium. The necessary magnesium compound is formed as an intermediate, but this immediately reacts with the transition metal compound to give the desired $\pi$-allyl compound of the transition metal.

Reaction is effected at temperatures between $-100$ and $100°$ C., depending upon the stability of the compounds produced in accordance with the invention, but temperatures below $0°$ C. are usually employed.

Another aspect of this invention resides in the $\pi$-allyl transition metal compounds produced by the above-described process.

The majority of the novel compounds are readily volatile, and this is particularly true of compounds with low hydrocarbon radicals. Isolation can thus be effected by distillation or sublimation. In other cases it is recommended to distil off the solvents employed for the reaction and to extract the desired products from the residue with, for example, hydrocarbons. Any salts formed as by-products remain behind undissolved. In the majority of cases, the novel compounds crystallise out satisfactorily.

The transition metal compounds of the present invention are highly efficient catalysts for reactions of unsaturated hydrocarbons, in particular 1,3-diolefins and acetylenes. Bis-$\pi$-methallyl nickel produced in accordance with the invention, for example, readily reacts with butadiene to form cyclododecatriene-(1,5,9).

The invention can be illustrated by the following examples which are in no way limitative:

EXAMPLE 1

20 g.$=0.09$ mol anhydrous nickel bromide are suspended in 150 cc. absolute ether and reacted at $-20°$ C. with 700 cc. of a solution (0.5 standard) of crotyl magnesium chloride (0.35 mol) in ether. The ether solution turns deep yellow. After four hours the ether is distilled off at 200 mm. Hg via a low-temperature column. 10.7 g. of a nickel compound in the form of yellow crystals, corresponding to the composition $NiC_8H_{14}$ and representing the previously unknown bis-$\pi$-crotyl nickel, can be sublimated off from the residue in high vacuum. Yield 70% of theory. This compound, too, is extremely sensitive to air and must be kept in cold storage.

EXAMPLE 2

Reaction is carried out as in Example 1, but the aforesaid nickel compound is reacted with a solution of methallyl magnesium chloride. The previously unknown bis-$\pi$-methallyl nickel of the composition $NiC_8H_{14}$ is obtained in yields of 50 to 60% of theory in the form of yellow crystals. The compound is sensitive to air and must be kept in cold storage.

EXAMPLE 3

12 g.$=0.09$ mol anhydrous nickel bromide and 24 g.$=1$ g. atom magnesium chips are introduced into 300 cc. absolute ether. Over a period of 6 hours, 30 g.$=0.33$ mol methallyl chloride in 200 cc. absolute ether are added dropwise to this mixture. A yellow-coloured ether solution, from which the bis-$\pi$-methallyl nickel is isolated in accordance with Example 1 or 2, is obtained. Yield 50–60% of theory.

EXAMPLE 4

575 cc. of an 0.46 molar solution of allyl magnesium chloride (0.264 mole) in ether are cooled to $-80°$ C. and in the course of 2 hours mixed with a solution of 14 g.$=0.087$ mol iron (III) chloride in 150 cc. ether. The ether solution turns deep yellowish-brown. When the reaction has finished, the ether is drawn off in vacuo at $-30$ to $-50°$ C. The residue is extracted at $-30°$ C. with pentane. The deep brown pentane extract is cooled to $-80°$ C., whereby gold crystals separate out. These are freed from the last traces of solvent in high vacuum at $-80°$ C. The crystals are volatile in high vacuum at $0°$ C. The previously unknown tris-$\pi$-allyl iron of the composition $FeC_9H_{15}$ is found. Yield 10 to 20% of theory.

The compound can only be stored at low temperatures. At room temperature the crystals decompose explosively. The compound is sensitive to air.

EXAMPLE 5

Reaction is carried out in accordance with Example 3 but iron (III) acetylacetonate is employed. Yield 20% of theory.

EXAMPLE 6

7.12 g.=0.02 mol cobalt (III) acetylacetonate are suspended in 100 cc. absolute ether. The suspension is cooled to −80° C. and 180 cc. of a solution (0.5 molar) of allyl magnesium chloride (0.09 mol) are added. A deep orange solution is obtained. The green acetylacetonate slowly disappears. When the reaction has finished, the ether is drawn off at 0.1 to 1 mm. Hg and −60° C. The residue is extracted at −60° C. with pentane and the extract is cooled to −80° C. Reddish-gold crystals, which when freed in high vacuum from the last traces of pentane, correspond to the composition $CoC_9H_{15}$ and represent the hitherto unknown tris-$\pi$-allyl cobalt, separate out. Yield 45 to 50% of theory.

The compound must be stored at low temperatures as it begins to decompose at 0° C. The compound is sensitive to air and is volatile in high vacuum.

EXAMPLE 7

Reaction is carried out as in Example 5 except that cobalt (II) chloride is employed. In the course of a disproportioning reaction tris-$\pi$-allyl cobalt is obtained, together with elementary cobalt. Yield 20% of theory.

EXAMPLE 8

A suspension of allyl magnesium chloride is prepared at 0° C. from 20 g.=0.82 g. atom magnesium chips, 350 cc. ether and 60 g.=0.79 mol allyl chloride in 100 cc. ether. The suspension is cooled to −30° C. and 28.4 g.=0.18 mol anhydrous chromium (III) chloride ground in 150 cc. ether are then added to form a fine suspension. The chromium (III) chloride disappears and a deep red solution is obtained. The ether is distilled off in vacuo at low temperatures and the residue is extracted with pentane at 0° C. The combined pentane extracts are cooled to −80° C., and deep bright red crystals separate out which, after further recrystallisation, correspond to the composition $CrC_9H_{15}$ and represent tris-$\pi$-allyl chromium. The compound is sensitive to air and volatile in vacuo. Yield 50 to 60% of theory.

EXAMPLE 9

11 g.=0.05 mol anhydrous nickel bromide are suspended in 50 cc. absolute ether and slowly mixed at −80° C. with 500 cc. of an 0.29 standard Grignard solution obtained from cinnamyl chloride and magnesium. When the reaction has finished the ether is drawn off in vacuo at a bath temperature of −30° C. and the residue is then extracted at −20° C. with absolute pentane. The yellowish-red pentane solution is cooled to −80° C., whereby 8 g. reddish-yellow crystals precipitate. The composition of these crystals corresponds to $(C_6H_5-C_3H_4)_2Ni$ (bis-$\pi$-cinnamyl-nickel).

EXAMPLE 10

8 g.=0.036 mol anhydrous nickel bromide are suspended in 20 cc. absolute ether and reacted at −80° C. with 250 cc. of an 0.44 standard Grignard solution produced from 3-bromine octadiene-(1,7) and magnesium. Working up is effected as in Example 9 and after 3 days 1.5 g. yellow crystals corresponding to the composition $(C_8H_{13})_2Ni$(bis-$\pi$-octadienyl-nickel) are obtained from the pentane solution at −80° C. Yield 14% of theory.

EXAMPLE 11

6 g.=0.027 mol anhydrous nickel bromide are suspended in 30 cc. absolute ether and mixed at −130° C. with 300 cc. of an 0.35 standard Grignard solution produced from 3-chlorocyclohexene and magnesium and pre-cooled to −80° C. The solution turns very dark in colour. After 10 hours the ether is drawn off at $10^{-3}$ to $10^{-4}$ torr and a temperature of −80° C. The dark coloured residue is extracted with pentane at −80° C. and the pentane solution is subsequently concentrated. After 2 days, yellowish crystals which decompose even at −30 to −40° C. and correspond to the composition $(C_6H_9)_2Ni$(bis-$\pi$-cyclohexenyl-nickel), can be isolated. The yield is low.

EXAMPLE 12

6 g.=0.034 mol palladium chloride are suspended in 30 cc. absolute ether and mixed at −80° C. with 400 cc. of an 0.35 standard allyl magnesium chloride solution. After 6–10 hours the ether is drawn off at −80° C. and $10^{-3}$ to $10^{-4}$ torr. 3.2 g. bis-$\pi$-allyl palladium in the form of light yellow crystals can be isolated from the residue by sublimination at $10^{-4}$ torr. Yield approx. 50% of theory.

EXAMPLE 13

3 g.=0.017 mol palladium chloride are suspended in 20 cc. absolute ether and mixed at −80° C. with 140 cc. of an 0.5 standard methallyl magnesium chloride solution. Working up is effected as in Example 12 and 0.36 g. bis-$\pi$-methallyl palladium in the form of yellow crystals is obtained. Yield: 10% of theory.

EXAMPLE 14

3.6 g.=0.014 mol anhydrous platinum chloride are suspended in 20 cc. absolute ether and mixed at −60° C. with 140 cc. of an 0.42 standard solution of allyl magnesium chloride. The ether solution turns reddish-yellow. Working up is effected as in Example 12 and small amounts of bis-$\pi$-allyl platinum in the form of light yellow crystals are obtained.

EXAMPLE 15

A solution of 22 g.=0.08 mol molybdenum pentachloride in 550 cc. absolute ether is added dropwise at 20° C. to a solution of 0.52 mol allyl magnesium chloride in 1 litre ether. The mixture is stirred for 24 hours. The precipitated magnesium chloride is then filtered off and washed with ether until the solution is colourless. The filtrate is freed from ether in vacuo and the residue is extracted with 500 cc. pentane. The filtered pentane solution is cooled to −80° C., 4 g. greenish black crystals of the composition $(Mo(C_3H_5)_2)_2$ being obtained. According to molecular weight determination, the bis-$\pi$-allyl molybdenum is dimeric. Yield: 20% of theory.

EXAMPLE 16

9.85 g.=16.9 mol tungsten pentabromide are dissolved in 350 cc. absolute ether and added dropwise at 20° C to a solution of 87 mol allyl magnesium chloride in 150 cc. ether. The mixture is stirred for 18 hours and then freed from ether in vacuo. The residue is extracted with 300 cc. pentane. The filtered pentane is concentrated and the residue is sublimated at $10^{-4}$ torr and a bath temperature of 70–75° C. 1.2 g. pale brown crystals of the composition $(3_3H_5)_4W$ (tetra-bis-$\pi$-allyl-tungsten are obtained. Yield: 20% of theory.

EXAMPLE 17

23.3 g.=0.1 mol zirconium tetrachloride are suspended in absolute ether and finely ground in a ball mill. The fine suspension thus obtained is filled up with absolute ether to 500 cm.³, cooled to −80° C., and then added dropwise, under stirring, to a mixture of 50 g.=0.5 mol allyl-magnesium chloride and 800 cm.³ ether which has also been cooled to −80° C. The mixture is stirred for a period of 12 hours at −80° C., filtered at −80° C., and freed from ether at $10^{-4}$ torr and −80° C. The residue is extracted three times, each time using 600 cm.³ absolute pentane. The extracts are also filtered at −40° C. and then concentrated in vacuo to about 300 cm.₃. The solution thus obtained is cooled to −80° C. whereby the zirconium tetra-$\pi$-allyl separates in the form of reddish black crystals. 10.2 g.=40% of theory of an analytically pure product are obtained as a first fraction. An additional amount of 7 g. zirconium tetra-$\pi$-allyl can be obtained from the mother liquor. Total yield: 17.3 g.=67.5% of theory.

EXAMPLE 18

13.55 g.=0.07 mol vanadium tetrachloride, dissolved in 200 cm.³ absolute pentane, are slowly added at —80° C. under vigorous stirring to 1400 cm.³ of an 0.5 M solution of allyl-magnesium chloride in such a manner that the temperature of the mixture does not exceed —70° C. After a period of about two hours, the mixture is filtered at about —80° C. and the other is distilled off at $10^{-4}$ and a temperature below —60° C. The dry, brown residue is extracted four times, each time using 300 cm.³ absolute pentane which has been cooled to —60° C., and the extracts are again filtered at —60° C. The very dark colored filtrate is free of halogen. It is concentrated at —80° C. and $10^{-4}$ torr to about 100 cm.³, whereby the tris-$\pi$-allyl-vanadium separates in the form of a very finely divided crystal powder. On a frit, the product is washed with a small amount of pentane which has been cooled to —80° C., and is subsequently dried at $10^{-4}$ torr. Upon contact with air, the tris-$\pi$-allyl vanadium ignites immediately and explodes under inert gas at temperatures of —40 to —30° C.

EXAMPLE 19

30 g.=0.08 mol ThCl₄ are suspended in 500 cm.³ ether, cooled to 0° C. and mixed, under vigorous stirring, with 1026 cm.³ of an 0.47 M solution of C₃H₅MgCl in ether. The mixture is stirred for 60 hours at 0° C. It is then cooled to —30° C., filtered, and then filtrate freed from all volatile substances at $10^{-4}$ torr. The residue is extracted at —30° C. in several steps with a total amount of 4 liters pentane. The extract is filtered and concentrated to 200 cm.³, whereby the $\pi$-Th(C₃H₅)₄ separates in the form of yellow crystals. 4.5 g.=14.3% of theory are obtained. Calculated: Th 58.6%. Found: Th 58.4%.

EXAMPLE 20

16.15 g.=0.06 mol NbCl₅ are suspended in 250 cm.³ ether and are mixed at —78° C. under vigorous stirring with 670 cm.³ of an 0.56 M solution of C₃H₅MgCl. The mixture is stirred for an additional period of 16 hours and subsequently filtered at —50° C., and the filtrate is evaporated to dryness at $10^{-4}$ torr. The residue is extracted with 800 cm.³ pentane which has been cooled to —50° C., and subsequently, the mixture is again filtered. The filtrate is free of magnesium salt and contains the green colored paramagnetic $\pi$=Nb(C₃H₅)₄. Upon further evaporating the solution, a green colored oil is obtained which, however, does not crystallize.

EXAMPLE 21

28 g. TaCl₅ in 200 cm.³ pentane are ground in a glass ball mill for a period of 8 hours. The fine suspension is then added to 1.6 liters of an 0.5 M solution of C₃H₅MgCl in ether at —80° C., subsequently filtered, and the filtrate evaporated at $10^{-4}$ torr. The residue is extracted in several portions with a total amount of 3 liters pentane at —80° C. The residue is dissolved in 300 cm.³ ether at —80° C. The green solution contains the paramagnetic Ta(C₃H₅)₄. The tantalum analysis indicates that the solution is 0.026 molar, i.e., the yield amounts to 11% of theory. The $\pi$-Ta(C₃H₅)₄ does not appear to crystallize.

A further aspect of this invention resides in the production of valuable derivatives of the $\pi$-allyl transition metal compounds set forth above. These compounds are generally of the type

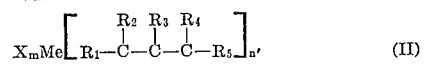
(II)

wherein R₁ to R₅ and Me have the same meanings as set forth above. In this regard, X is an anion, $m$ and $n'$ are each an integer of 1 to 3 and $m+n'$ are equal to 2 to 4. It is characteristic for the compounds of Formula I that the transition metals are bound to a $\pi$=allyl system or $\pi$-allyl systems, and in the simplest case to the $\pi$-allyl group as such or their hydrocarbon, i.e., alkyl, aryl or aralkyl and their cyclic derivatives. As $\pi$-allyl system is defined a grouping of 3 C atoms, which is bound as a substantially planar system to a central atom in substantially the same manner by way of all 3 C atoms.

In the simplest case of the bis-$\pi$-allyl-nickel with an empirical formula $\pi$-(C₃H₅)₂Ni, this type of bond is represented as follows:

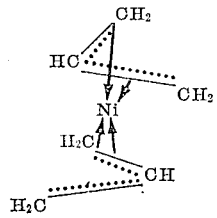

The roentgenographic structural analysis of the corresponding methyl derivative, the bis-$\pi$-methallyl nickel, has shown that a "sandwich" type compound is involved in which the two methallyl groups are bound to the nickel atom as planar systems in such manner that the CH₃ groups go into the antiposition:

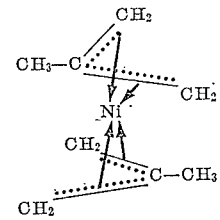

In the compounds of type I, producible in accordance with the invention, at least one each such planar $\pi$-allyl systems is bound to a metal atom.

The metals occur in these compounds in different formal valences, and accordingly, 1 to 4 of such $\pi$-allyl systems are bound to the particular transition metal. Likewise, the possibility exists that 2 of such $\pi$-allyl systems are connected with one another via the substituents R₁–R₅, so that an open-chain system exists, which is bound to the transition metal via two $\pi$-allyl groups.

Some $\pi$-allyl-Me-X compounds are already known. Thus E. O. Fischer and G. Burger (Z. Naturforsch. 16b, 77 (1961) Report 94, 2409 (1961)) have for the first time described the preparation of the $\pi$-allyl-nickel bromide from the extremely poisonous nickel carbonyl and allyl bromide. The yields were given as only 11% of theory. Also known is the conversion of butadiene-iron-tricarbonyl with anhydrous hydrogen chloride (F. J. Impastato and K. G. Ihrman, J. Am. Chem. Soc. 83, 3276 (1961)), which leads to the formation of a $\pi$-crotyl-iron-tricarbonyl-chloride.

However, these methods for the preparation of these compounds are unsatisfactory since the reaction products can be obtained only in low yields and since it is necessary to proceed for their production from the generally extremely poisonous metal carbonyls. A further disadvantage of these processes consists therein, that frequently not the pure compounds of the above named type are formed, but that complexes result in which still further substituents, such as for example CO-groups, are contained.

It was found that compounds of the type $\pi$-allyl-Me-X of the general Formula II may be produced very easily and with practically quantitative yields directly from $\pi$-allyl compounds of the transition metals of the Subgroups IVb, Vb, VIb or VIII of the Periodic System having at least twice the effective grouping.

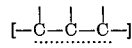
III bonded to Me as for instance in the general Formula II in which $n'$ is at least 2.

I have discovered that these π-allyl Me compounds, in which the π-allyl moiety is present at least twice, form π-allyl-Me-X compounds when reacted, such as by contacting, with an acid of the type HX. The anionic radical X⁻ attaches to the transition metal of the π-allyl compound and the liberated H⁺ splits off one of the allyl radicals and is thus removed.

The reaction in accordance with the invention proceeds with HX according to the Equation 1

$$\pi\text{-}(C_3H_5)_2Ni + HCl \rightarrow \pi\text{-}(C_3H_5)NiCl + C_3H_6 \quad (1)$$

Thus, for each equivalent HX, one equivalent of allyl radical is detached from the transition metal.

In similar manner, the compounds of the type π-allyl-Me-X may be produced if one proceeds from complexes of transition metals with exclusive multiple olefins by reacting these with an acid HX. The expression "exclusive multiple olefins" means hydrocarbon moieties which have olefinic unsaturation as the sole functional group or groups. Cyclooctatetraene-nickel-(O) is an example for a complex of a transition metal connected to a multi-ene cyclic structure producible, for example, according to my copending application, Ser. No. 532,900. Further complexes of transition metals with exclusive multiple olefins can be produced, for example, according to my copending application Ser. No. 104,221 and Ser. No. 532,900. Thus, π-cyclooctatrienyl-nickel chloride can be produced by reaction of cyclooctatetraene-nickel-(O) with anhydrous hydrogen chloride according to the following Equation 2

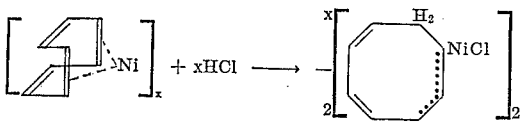

The X in HX signifies an anionic radical to which is bound the hydrogen atom in the sense of the polarization H⁺X⁻. Compounds of the type HX are preferably anhydrous hydrogen halides, though also other acid compounds, for example, organic acids and particularly carboxylic acids, as well as phenols, thiophenols, mercaptans, hydrocyanic acid and 1,3-diketones (enol form) may be used.

Furthermore, the π-allyl-Me-X compounds can also be produced by reacting the π-allyl-Me compounds in which the π-allyl moiety is present at least twice, with a halogen in lieu of an acid (H⁺X⁻). In this case, the halogen attaches to the transition metal displacing an allyl radical. The reaction in accordance with the invention, using a halogen instead of an HX compound, proceeds according to the Equation 3

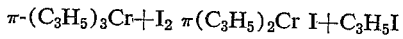

wherein for each equivalent of halogen reacted, formally one equivalent of allyl radical is detached from the transition metal. Preferred halogens are iodine and bromine.

The processes in accordance with the invention are advantageously carried out with solutions of the starting materials in solvents inert for the π-allyl metal compounds and the referred to complexes, since the reactions proceed in solution precisely stoichiometrically. Suitable solvents are aliphatic or aromatic ethers, cyclic ethers, saturated or aromatic and halogenated hydrocarbons substantially inert to these compounds and complexes. The conversions are preferably carried out at temperatures of from −80° to +100° C.

In most cases the reaction products result at once in crystallized form. In some cases the reaction products are recrystallized from suitable solvent solutions.

All operations in the following examples were carried out under exclusion of air and humidity, i.e., under a protective gas, such as for example argon or nitrogen, since the compounds producible in accordance with the invention are sensitive to air or humidity.

EXAMPLE 22

Into a solution of 47 g. bis-π-allylnickel in about 1000 cm.³ ether are introduced slowly under stirring at −80° equimolecular quantities (8.0 l. at 20°) of anhydrous hydrogen chloride. The initially yellow-orange colored solution therein becomes red-brown. After a short time brown crystals of π-allylnickel-chloride separate from the solution. The suspension is stirred for another hour at −80°, and for the completion of the reaction briefly heated up to 20°. Again one cools to −80°, filters off the crystals and dries them in a vacuum. Obtained are 33 g.=73% of the theory. Product of the composition $C_3H_5NiCl$. Calculated: 43.5%. Found: 43.3% Ni. From the mother liquor further quantities of the compound may be isolated.

EXAMPLE 23

A solution of 25 g. bis-π-allylnickel in about 1000 cm.³ ether is converted at −80° with 4.1 anhydrous hydrogen bromide. The reaction mixture is worked up and obtained are 27.0 g.=88% of the theory. Product of the composition $C_3H_5NiBr$. Calculated: 32.7%. Found: 32.4% Ni.

EXAMPLE 24

A solution of 41.3 g. bis-π-allylnickel in about 1000 cm.³ ether is converted at −80° with 7.4 l. (5 % excess) anhydrous hydrogen iodide. Obtained are 59 g.=89% of the theory of red crystals of the composition $C_3H_5NiI$. Calculated: 25.9%. Found: 25.6% Ni.

EXAMPLE 25

According to Example 22 bis-π-methallylnickel is converted at −80° with anhydrous hydrogen chloride. From the red-brown reaction solution are isolated red-brown crystals of the composition $C_4H_7NiCl$. Calculated: 39.3%. Found: 39.2% Ni.

EXAMPLE 26

According to Example 22 is converted an ethereal solution of bis-π-crotylnickel at −80° with anyhydrous hydrogen chloride. Obtained is, in the form of red-brown crystals, the π-crotyl-nickelchloride of the composition $C_4H_7NiCl$. Calculated: 39.3% Ni. Found: 39.5% Ni.

EXAMPLE 27

According to Example 22 are converted 0.61 g. bis-π-cyclooctenyl-nickel in ethereal solution at −80° with equimolecular quantities (72 cm.³ at 20°) anhydrous hydrogen chloride. The solvent is evaporated and the residue freed from cyclooctene at 10⁻⁴ Torr (Torricellian vacuum). Subsequently the residue is recrystallized from an ether-pentane mixture. The π-cyclooctenylnickelchloride is obtained in the form of red-brown crystals of the composition $C_8H_{13}NiCl$. Calculated: 28.9%. Found: 28.9% Ni.

EXAMPLE 28

9 g.=52.4 mmol tris-π-allylchromium are converted in 1.5 l. ether at −80° with 1.87=51.4 mmol anhydrous hydrogen chloride. The mixture is stirred for one hour and subsequently filtered over a G–4 frit. At −20° the solvent is removed and the residue subsequently dried at 10⁻⁴ torr. The yield of bis-π-allyl-chromiumchloride amounts to 80%. A sample recrystallized from ether shows the following composition: $(Cr(C_3H_5)_2Cl)_2$. Calculated: Mg, 339.22; Cr, 30.65%; Cl 20.95%. Found: Mg, 333; Cr, 30.48%; Cl, 21.20%.

EXAMPLE 29

2.9 g.=15.84 mmol tris-π-allyl-cobalt are converted in 250 cm.³ ether with 355 cm.³=15.84 mmol anhydrous hydrogen chloride at −80°. The reaction mixture is stirred for two hours at −50°. Obtained is a red-brown crystallizate, which is isolated at low temperatures and subsequently dried at −80° and 10⁻⁴ torr. The product was analyzed in the following manner:

The crystals were suspended at −80° in 200 cm.³ of cold toluene. The mixture then was heated to −25°, so that a clear red solution resulted. At temperatures above −20° the complex already decomposes slowly. 2 cm.³ each of this solution were analyzed as well as to cobalt as also to halogen; 2 cm.³ of the above named solution contained: 0.0357 mmol cobalt and 0.035 mmol chlorine. Accordingly the yield of bis-π-allyl-cobaltchloride amounts to 22.5% and the product is of about 98% purity.

EXAMPLE 30

12.3 g. bis-cyclooctadiene-nickel-(O) are suspended in 100 cm.³ toluene and converted at 0° under stirring with 1070 cm.³ (at 20°) anhydrous hydrogen chloride. The solution at once becomes colored deep-red, and at the walls of the reaction vessel forms a thin nickel surface. The red solution is evaporated and the residue recrystallized from methylene-chloride. The red powder, resulted in almost quantitative yield, corresponds to the composition $C_8H_{13}NiCl$. It is identified as a π-cyclooctenylnickel-chloride. Calculated: 28.9%. Found: 28.0% Ni.

EXAMPLE 31

10.0 g.=36.4 mmol bis-cyclooctadiene-nickel-(O) are suspended in 50 cm.³ benzene, and converted at 20° with 2.0 cm.³ glacial acetic acid (2.1 g.=35 mmol). Within about 25 minutes the crystals dissolve and after further 20 minutes all volatile constituents are distilled off at 10⁻⁴ torr. The remaining red oil is dissolved in 50 cm.³ hexane. The solution is cooled to −70°, wherein red-brown crystals are separated. Yield: 5.5 g.=67% of the theory of π-cyclooctenylnickelacetate. $C_{10}H_{16}O_2Ni$ calculated: M.W. 226.7; Ni, 25.9%. Found: M.W., 363 Ni, 25.95%.

EXAMPLE 32

11.2 g.=40.8 mmol bis-cyclooctadiene-nickel-(O) are suspended in 75 cm.³ toluene and converted at 20° with 4.5 cm.³ ethylmercaptan. The mixture is stirred for 4 hours and subsequently filtered over a G–4 frit. The filtrate is evaporated and the crystalline residue is recrystallized from a toluene-hexane mixture. The crystals correspond to the π-cyclooctenylnickel-mercaptide of the composition $C_{10}H_{18}SNi$. The red-brown crystals showed the following analysis. Calculated: Ni, 25.70%. Found: Ni, 26.0%. Calculated: M.W., 228.7 (as dimer 457.4). Found: M.W. 462.

EXAMPLE 33

19.6 g.=71.3 mmol bis-cyclooctadiene-nickel-(O) are treated in 50 cm.³ benzene with 10 cm.³=97.7 mmol acetylacetone. The suspension is stirred for in all 4–5 days until all crystals have become dissolved. Subsequently all volatile constituents are distilled off at 10⁻¹ torr and maximally 40°. The residue is dissolved in 50 cm.³ hexane (about 50°) and then the solution is cooled to 0°. Obtained are 13–14 g. of red-brown crystals, which may be sublimated at 10⁻⁴ torr and 60°. Yield: 75% of the theory of π-cyclooctenyl-nickelacetylacetonate $C_{13}H_{20}O_2Ni$ calculated: C, 58.50%; H, 7.51%; Ni, 22.0%. Found: C, 58.18%; H, 7.97%; Ni, 22.1%.

EXAMPLE 34

6.44 g.=39.6 mmol cyclooctatetraene-nickel-(O) are converted in the course of 2 hours at 45–50° with 25 cm.³ pure glacial acetic acid. Subsequently all volatile constituents are distilled off in vacuum. The residue is recrystallized from 250 cm.³ toluene at 70°. Obtained are 5.3 g.=60% of the theory of red crystal needles of the π-cyclooctatrienylnickelacetate of the composition $C_{10}H_{12}O_2Ni$. Calculated: M.W., 222.8 (or respectively as dimer 445.5); Ni, 26.3%. Found: M.W. 494; Ni, 26.0%.

EXAMPLE 35

2.05 g.=12.6 mmol cyclooctatetraene-nickel-(O) are heated for 5 hours in 25 cm.³ acetylacetone to 100°. One permits to cool and then filters the intensely red colored solution. The filtrate is evaporated at vacuum and the residue is dissolved in hot hexane. Obtained are 0.5 g.= 15% of the theory of brown crystals of the π-cyclooctatrienylnickel-acetylacetonate of the composition $C_{13}H_{16}O_2Ni$. Calculated: Ni, 22.3%. Found: 22.3%. Undissolved remain in hexane 1.2 g. nickel-acetylactonate.

EXAMPLE 36

50.3 g.=0.31 mmol cyclooctatetraene-nickel-(O) are suspended in 750 cm.³ toluene and at −80° converted slowly under shaking with 7.55 l. anhydrous hydrogen chloride. One permits thawing to 20° and filters off the red suspension formed. From the mother liquors further constituents may be isolated. In all are obtained 46 g.= 75% of the theory of reaction product of the composition $C_8H_9ClNi$, i.e., thus π-cyclooctatrienyl-nickel-chloride. Calculated: Ni, 29.5%; Cl, 17.85%. Found: Ni, 29.2%; Cl, 18.15%.

EXAMPLE 37

5.5 g.=31.4 mmol tris-π-allylchromium are dissolved in 350 cm.³ ether and converted at 0° with a solution of 3.99 g.=15.7 mmol iodine in 100 cm.³ ether. The mixture is stirred overnight at 0° and subsequently concentrated in vacuum to about 50 cm.³. Brown crystals separate. For the completion of the crystallization one cools to −80° and then filters off the reaction product. One washes with a little ether at −80° and subsequently one dries at 10⁻⁴ torr. The yield of bis-π-allyl-chromium-iodide amounts to 7 g.=85% of the theory.

calculated: M.W., 522.13; Cr, 19.92%; I, 48.61%. Found: M.W. 490; Cr, 19.95%; I, 48.25%.

EXAMPLE 38

Into a solution of 6.6 g. bis-π-allylnickel in 400 cm.³ ether is added drop by drop under stirring at −80°, a solution of 11.9 g. iodine in ether. A black precipitation results. The solvent is distilled off and the residue extracted with fresh ether. The filtered extract is cooled to −80°, therein deep-red shining crystals of π-allylnickel-iodide are separated. Yield: 2.75 g.=25% of the theory. Calculated: Ni, 25.9%. Found: Ni, 25.4%.

EXAMPLE 39

0.05 g.=27.7 mmol tris-π-allylcobalt are dissolved in 200 cm.³ ether and converted at −50 to −60° with a solution of 3.52 g.=13.85 mmol iodine in 60 cm.³ ether. The mixture is kept overnight under stirring at −80°. Therein brown crystals are separated, which are rendered impure by slight quantities of green crystals. The crystallizate freed from the solvent is dried at −80° and 10⁻⁴ torr. The crystallizate is treated at −80° with 200 cm.³ cold toluene and the mixture heated to −30°. One filters and obtains a deep-red clear solution. 2 cm.³ each of the solution obtained were analyzed as to cobalt, or respectively as to iodine. 2 cm.³ contained 0.0862 mmol cobalt, or respectively 0.0850 mmol iodine. Accordingly, the bis-π-allylcobaltiodide is of 98.7%, while the yield amounts to 31.2%. This indirect analysis is necessary since the product is not stable at room temperature.

EXAMPLE 40

1.07 g.=5.65 mmol bis-π-allyl-palladium are dissolved in 50 cc. of ether. There was then passed into this solution, which was cooled to −80° 150 cc. of dry HCl gas (105% of theory). Thereafter the solvent is distilled off at 10 torr and the yellow residue is crystallized from toluol. There are obtained 0.8 g.=80% of theory of pure π-allylpalladiumchloride.

EXAMPLE 41

1.84 g.=4.25 mmol bis-π-allyl-platinum were dissolved in 50 cc. of pentane whereupon the product was reacted at −80° with 120 cc. of dry HCl gas (107% of theory). A bright yellow compound precipitates, which is difficultly soluble in all normal solvents. After separation of the product by filtration, the same is washed with pentane and dried. There is obtained 1.1 g.=94.5% of theory of π-allyl-platinum chloride.

EXAMPLE 42

3.1 g.=12.5 mmol 1-allyl-1,2,3,4-tetramethyl-π-cyclobutenyl-π-allyl-nickel of the formula

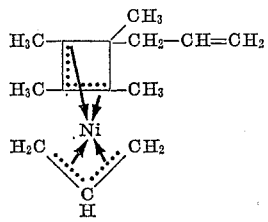

are dissolved in 50 cc. of pentane and are reacted at −80° with 325 cc. of dry HCl gas (104% of theory). There then immediately precipitates a reddish-brown product from which the solvent is removed at $10^{-4}$ torr and 0°. The residue is 2.73 g.=90% of theory. The raw product is then recrystallized from ether and there are obtained a pure 1-allyl-1,2,3,4-tetramethyl-π-cyclobutenylnickelchloride of the formula

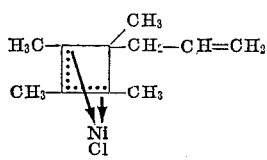

Calculated: Nickel, 24.2%. Found: Ni, 24.2%.

EXAMPLE 43

3 g.=13.7 mmol of the bis-π-allyl compound

of the following structural formula

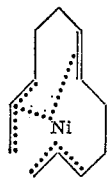

are reacted in 100 cc. ether with gaseous HCl at −40° C. Excess HCl as well as the ether are then removed in vacuum. The residue is dried in high vacuum at 20° C. There are obtained a red oil, the composition of which corresponds to the empirical formula $C_{12}H_{19}NiCl$ and the structure of which corresponds to the $H^1$-NMR-Spectrum as well as the IR spectrum of the following formula

Calculated: Ni, 22.8%. Found: Ni, 22.3%.

EXAMPLE 44

1.92 g.=7.53 mmol tetra-π-allylzirconium are dissolved in 200 cc. ether at −80° C. The reaction vessel is evacuated, whereupon 337.6 N cc.=0.55 g.=15.06 mmol of dry HCl gas is admitted with stirring and vigorous cooling. Upon termination of the reaction the solution is concentrated to about 50 cc. whereby the bis-π-allylzirconiumdichloride precipitates in the form of fine, light yellow crystals. The crystals are collected on a clay plate at low temperatures, washed with a little cold ether and then dried in vacuum on the plate. There is obtained 1.2 g. =4.92 mmol of the product, i.e. the yield is 65% of theory. The yield may be increased by further concentrating the filtrate. The bis-π-allylzirconium-dichloride decomposes at 20° C. in the course of a few hours. On reaction with alcohol there are obtained 2 mol propylene per gram atom zirconium.

EXAMPLE 45

2.33 g.=24.8 mmol phenol are dissolved in 50 cc. of ether and added dropwise at −40° C. to a solution of 4.35 g.=24.8 mmol of tris-π-allylchromium in 100 cc. of ether. The mixture is kept at −10° C. for 12 hours. Brownish crystals are precipitated thereby. The mixture is cooled to −80° C. and the crystals are separated. The residue is washed with small amounts of ether and dried at −80° C. and $10^{-4}$ mm. Hg. There are obtained 3.9 g. =70% of theory of bis-π-allylchromiumphenolate in the form of brownish crystals which correspond to $(C_3H_5)_2Cr(OC_6H_5)$.

EXAMPLE 46

0.93 g.=2.66 mmol of tetra-π-allyl-tungsten dissolved in 50 ml. of pentane are reacted at −80° C. with 70 cc.= 2.66 mmol of gaseous hydrogen chloride. The mixture is warmed up to −30° C., while vigorously stirring. A yellow precipitate is formed which is separated and dried at $10^{-4}$ mm. Hg. There are obtained 0.7 g.=77% of theory of tris-π-allyl-tungsten chloride which corresponds to $(C_3H_5)_3WCl$.

The properties, activity and reactivity of the π-allyl metal compounds herein described are solely due to the π-allyl linkage and the particular stereo positioning of atoms thereby defined. Thus, their effective grouping which is controlling for said properties, activity and reactivity is

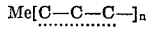

or

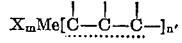

in which Me is a transition metal as defined above, and in which $X^-$ is an anionic acid radical and preferably halogen, $n$ is an integer of 1–4, $m$ and $n'$ each designating an integer of 1–3, with $m+n'$ being 2–4. For this reason, any particular substituent or substituents are generally not material in either the conversion of the π-allyl-Me to its "salt" compound or to their catalytic or other properties or reactivities. This is well illustrated by the fact that short and long chain aliphatic substituents, cyclic substituents, including those of the bulky pinenyl and various aromatic substituents, all as shown by the at-times highly substituted examples, do not affect the basic properties of these π-allyl-metal compounds.

It is still a further aspect of this invention to provide derivatives of either the π-allyl transition metal compounds according to Formula I or the salt derivatives according to Formula II, or both, by adding to said compound and/or salt at least one Lewis acid and/or Lewis base. Lewis acids within the meaning of this invention are illustrated by $R_2AlY$, $RAlY_2$ and $AlY_3$, wherein R is at least one member of the group consisting of alkyl, cycloalkyl, aralkyl and aryl, and Y is at least one member of the group consisting of chloride, bromide and iodide. Lewis bases are illustrated by phosphines, phosphites, phosphorus triamides, arsines, arsinites, arsenic triamides, stibines, stibites, antimony triamides, bismuthines, bismuthites, bismuth triamides and sulfoxides; and in particular, Lewis bases such as triphenyl-phosphine, tricyclohexyl-phosphine, diphenyl-phosphine, triisopropyl-phosphine, trimethylphosphite, tri-(o-oxydiphenyl)-phosphite, tri-o-cresyl-phosphite, triphenyl-arsine and phosphoric acid-tridiethylamide, or Lewis acids such as aluminum trichloride, aluminum tribromide, ethyl aluminum dichloride, and diethyl aluminum monochloride.

The π-allyl transition metal compounds, salts and Lewis acid and/or base derivatives thereof all have been found to catalyze the reactions of olefins (mono- and/or diolefins) and particularly, to catalyze the cyclooligomerization thereof.

It is within the scope of this invention to produce compounds of Formula II in dimeric form. It is further possible to produce chain oligomers of such compounds, for example, dimers, trimers and/or tetramers, etc. These oligomers depend upon at least two allyl groups being present in the allyl-containing portion of the compound.

The following examples are further illustrative of the practice of this invention.

EXAMPLE 47

Into a mixture of 1.57 g' tris-bicycloheptene-nickel-(O) in 100 cm.³ toluene is added drop by drop at −30° C. a solution of 6.1 g. allyl-bromide in toluene under stirring. Obtained is a deep red solution which is warmed to room temperature and then filtered. The solvent is distilled off in vacuum and the residue dried at $10^{-4}$ torr. The product is recrystallized from ether, and obtained is a red powder of the composition $C_3H_5NiBr \cdot C_7T_{10}$, it is a π-allyl-nickel-bromide to which is still complexbound a bicycloheptene molecule. Calculated: Ni, 21.4%. Found: Ni, 21.0%.

EXAMPLE 48

A suspension of 4.9 g. bis-cyclooctadiene-nickel-(O) in 100 cm.³ toluene is converted at −20° C. with a solution of 2.7 g. cinnamylchloride in toluene under stirring. Subsequently, the suspension is stirred for two hours at −5 to −10° C. Toluene and cyclooctadiene are distilled off in vacuum and the residue dried at $10^{-4}$ torr. The reaction product is dissolved in ether, filtered, and the clear solution cooled to −80° C. Therein the π-cinnamyl-nickelchloride is separated in the form of red shining crystals of the composition $C_9H_9ClNi$. Calculated: Ni, 27.8%. Found: Ni, 27.8%.

EXAMPLE 49

According to Example 48, bis-cyclooctadiene-nickel-(O) is converted with 1-chlorocyclohexene-(2). Obtained is a red solution which contains the π-cyclohexyl-nickel-chloride.

EXAMPLE 50

According to Example 48, bis-cyclooctadiene-nickel is converted with cyclododecatrienyl-chloride. Obtained is a red solution which contains a π-cyclododecatrienyl-nickel-chloride.

EXAMPLE 51

8.4 g.=30.5 mmol bis-cyclooctadiene-nickel-(O) are dissolved in 30 cc. of toluene and there is dropwise added at −40° C. 3.5 g.=24.1 mmol of 3-chlor-cyclopentene. In the course of the addition, the yellow solution turns dark red. Traces of metallic nickel were separated and removed. The clear solution is concentrated to dryness after 36 hours at $10^{-4}$ torr. The red colored residue is extracted with pentane. There then remains undissolved the π-cyclopentenyl-nickel-chloride. The red product is filtered off and dried. There are then obtained 3.5 g.=71.5% of theory of π-cyclopentenyl-nickelchloride. Calculated: Ni, 36.4%. Found: Ni, 36.8%.

EXAMPLE 52

6.1 g.=22.2 mmol bis-cyclooctadiene-nickel-(O) are dissolved in 50 cc. of toluene, whereupon there is added at −20° C. 4.1 g.=24.5 mmol of benzyl-allylchloride [1-phenyl-4-chlor-butene-(2)] dissolved in 40 cc. of toluene. The yellow colored solution turns red. The toluene is removed at $10^{-4}$ torr and the orange-red colored residue is then extracted with pentane. The red colored product is then filtered off and dried in vacuo. There are obtained 4 g.=80% of theory of the benzyl-π-allyl-nickelchloride. Calculated: Ni, 36.04%. Found: Ni 25.6%.

EXAMPLE 53

82.0 g.=0.3 mol of bis-cyclooctadiene-nickel-(O) are suspended in 300 cc. of ether, whereupon there is added at −20° C. with vigorous stirring, a solution of 40 g.=0.33 mol of allylbromide within a period of 3–4 hours. After the reaction is completed, the mixture is cooled down to −80° C. There then precipitates the π-allyl-nickelbromide which is filtered off. Calculated: Ni, 32.6%. Found: Ni, 32.2%.

EXAMPLE 54

23 g.=83.6 mmol bis-cyclooctadiene-nickel-(O) are suspended in 50 cc. of ether and are then admixed at −20° C. in the course of 15 hours with a solution of 19.8 g.=92.2 mmol myrtenyl-bromide in 50 cc. ether with stirring. After about 36 hours, the starting complex material has been converted. The solution is filtered at −20° C. and is thereafter cooled to −80° C. The red crystals separate. They are filtered off at a low temperature and are dried at $10^{-4}$ torr. There is obtained 10.5 g.=46% of theory of pure π-pinenyl-nickelbromide.

EXAMPLE 55

6.9 g.=25 mmol bis-cyclooctadiene-nickel-(O) in 8 cc. of toluene are admixed at −10° C. with a suspension of 10 g. of 1,2,3-triphenyl-cyclopropenylbromide in 30 cc. of toluene. The mixture is stirred for a period of 24 hours. Thereafter, all of the volatile components are distilled off at $10^{-4}$ torr and the residue is thereafter crystallized from toluene at +60° C. There are obtained 7 g.=69% of theory of 1,2,3-triphenyl-π-cyclopropenyl-nickelbromide.

The following example illustrate the preparation of π-allyl transition metal compound complexes with various Lewis acids and/or Lewis bases.

EXAMPLE 56

3.75 g. π-allyl-nickeliodide are converted in 100 cm.³ ether at −80° C. with 4.33 g. triphenylphosphine (mol ratio 1:1). One heats briefly to 20° C. and then filters off the complex resulting in the form of red-brown crystals $(\pi\text{-}C_3H\text{-}NiI \cdot P(C_6H_5)_3)'$ Yield: 5.7 g.=70% of theory. Calculated: Ni, 12.0%. Found: Ni, 12.1%.

EXAMPLE 57

4.2 g. π-allyl-nickeliodide are converted according to Example 56, however, with 5.17 g. tricyclohexylphosphine. Obtained is likewise a red-brown crystallizate, which corresponds to the composition $(\pi\text{-}C_3H_5NiI\text{-}P(C_6H_{11})_3)$. Calculated: Ni, 11.55%. Found: Ni, 11.35%.

EXAMPLE 58

3.38 g. π-allyl-nickeliodide are converted according to Example 56, however, with 8 g. tris-(o-oxydiphenyl)-phosphine. Obtained is a red-brown crystallizate of the composition π-$C_3H_5NiI$-$P(OC_6H_4C_6H_5)_3$. Calculated: Ni, 7.70%. Found: Ni, 7.55%.

EXAMPLE 59

A 1:1:1-adduct of π-allyl-nickeliodide, triorthocresyl-phosphite and ethyl aluminum-dichloride was prepared by dissolving 2.54 mmols of π-allyl-nickeliodide, 2.54 mmols of triorthocresyl-phosphite and 5 mmols ethyl aluminum-dichloride in 150 ml. of chlorobenzene.

EXAMPLE 60

A 1:1:1-adduct was produced by dissolving 2.04 mmols of a 1:1-addition product of triphenyl-arsin and π-allyl-nickeliodide together with 4.1 mmols of ethyl aluminum-dichloride in 100 cc. of chlorobenzene.

The following list of compounds is exemplary of the class of compounds which are producible according to the processes described above and within the scope of this invention:

tris-(π-allyl)-chromium
bis-(π-allyl)-chromium-iodide
bis-(π-allyl)-chromium-chloride
tris-(π-allyl)-cobalt
bis-(π-allyl)-cobalt-iodide
bis-(π-allyl)-cobalt-chloride
π-cyclooctatrienyl-nickel-chloride
π-cyclooctenyl-nickel-chloride
π-allyl-nickel-iodide
π-allyl-nickel-bromide
π-pinenyl-nickel-bromide
π-crotyl-nickel-iodide
π-cinnamyl-nickel-chloride
1,2,3-triphenyl-π-cyclopropenyl-nickel-bromide
π-allyl-palladium-chloride
π-allyl-nickel-chloride
tetra-(π-allyl)-zirconium
tris-(π-allyl)-vanadium
π-allyl-nickel-chloride compound of the formula $$C_{12}H_{19}NiCl$$

π-cyclododecadienyl-nickel-chloride
π-cyclohexenyl-nickel-chloride
π-cyclododecatrienyl-nickel-chloride
π-cyclopentenyl-nickel-chloride
benzyl-π-allyl-nickel-chloride
bis-(π-methallyl)-nickel
π-methallyl-nickel-chloride
bis-(π-crotyl)-nickel
bis-(π-cycloctenyl)-nickel
π-cyclooctenyl-nickel-acetate
π-cyclooctenyl-nickel-mercaptide
π-cyclooctenyl-nickel-acetylacetonate
π-cyclooctatrienyl-nickel-acetate
π-cyclooctatrienyl-nickel-acetylacetonate
bis-(π-allyl)-palladium
bis-(π-allyl)-platinum
1-allyl-1,2,3,4-tetramethyl-π-cyclobutenyl-π-allyl-nickel
1-allyl-1,2,3,4-tetramethyl-π-cyclobutenyl-nickel-chloride
1,6-di-π-allyl-hexen-3-yl-nickel
1-π-allyl-nonadiene-3,7-yl-nickel-chloride
bis(π-allyl)-zirconium-dichloride
bis-(π-allyl)-chromium-phenolate
tetra-(π-allyl)-tungsten
tris-(π-allyl)-tungsten-chloride
tris-(π-allyl)iron
bis-(π-cinnamyl)-nickel
bis-(π-octadienyl)-nickel
bis-(π-methallyl)-palladium
[bis-(π-allyl)-molybdenum]$_2$
bis-(π-cyclohexenyl)-nickel
tetra-(π-allyl)-thorium
tetra-(π-allyl)-niobium
tetra-(π-allyl)-tantalum
adduct of bis-(π-allyl)-chromium-chloride and ethyl aluminum-dibromide
adduct of bis-(π-allyl)-cobalt iodide and ethyl-aluminum-dichloride
adduct of bis-(π-allyl)-cobalt chloride and diethyl-aluminum chloride
adduct of bis-(π-allyl)-cobalt-chloride and ethyl-aluminum dichloride
adduct of π-allyl-nickel iodide and ethyl aluminum dichloride
adduct of π-allyl-nickel iodide and triphenyl-phosphine
adduct of π-allyl-nickel-iodide, triphenylphosphine and ethyl-aluminum-dichloride
adduct of π-allyl-nickel-iodide, triphenylphosphine and aluminum-bromide
adduct of π-allyl-nickel-iodide and tricyclohexyl-phosphine
adduct of π-allyl-nickel-iodide, tricyclohexyl-phosphite and ethyl-aluminum-dichloride
adduct of π-allyl-nickel-iodide, tricyclohexyl-phosphine and ethyl-aluminum-dichloride
adduct of π-allyl-nickel-iodide and tris-(ortho-oxydiphenyl)-phosphite
adduct of π-allyl-nickel-iodide, tris-(o-oxydiphenyl)-phosphite and ethyl-aluminum-dichloride
adduct of π-pinenyl-nickel-bromide and tricyclohexyl-phosphine
adduct of π-pinenyl-nickel-bromide, tricyclohexyl-phosphine and aluminum-bromide
adduct of π-allyl-nickel-bromide, triisopropyl-phosphine and aluminum-bromide
adduct of π-allyl-nickel-bromide, phosphoric acid tri-(N-diethyl)-amide and ethyl aluminum-dichloride
adduct of π-allyl-nickel-iodide, tri-(o-cresyl)-phosphite and ethyl-aluminum-dichloride
adduct of π-allyl-nickel-bromide and triethyl-phosphine
adduct of π-allyl-nickel-bromide, triethyl-phosphine and aluminum-bromide
adduct of π-allyl-nickel-iodide, triphenyl-arsine and ethyl-aluminum-dichloride
adduct of π-crotyl-nickel-iodide and ethyl-aluminum-dichloride
adduct of π-cinnamyl-nickel-chloride, diphenyl-phosphine and ethyl-aluminum-dichloride
adduct of 1,2,3-triphenyl-π-cyclopropenyl-nickel-bromide and aluminum-bromide
adduct of π-allyl-palladium-chloride and ethyl-aluminum-dichloride
adduct of π-allyl-nickel-chloride and ethyl-aluminum-dichloride
adduct of π-allyl-nickel-bromide and aluminum-bromide.

What is claimed is:
1. Process for preparing π-allyl transition metal compounds of the formula

$$Me[R_1-\underset{|}{\overset{R_2}{C}}-\underset{|}{\overset{R_3}{C}}-\underset{|}{\overset{R_4}{C}}-R_5]_n$$

wherein Me is a transition metal selected from the group consisting of metals of Groups IVb, Vb, VIb and Group VIII of the Periodic Table; n is 2 to 4 and $R_1$ to $R_5$ are different or the same and are each a substituent selected from the group consisting of hydrogen, alkyl-, cycloalkyl-, aralkyl- and aryl radicals, and $R_1$ and $R_4$ together with said π-allyl group can form a closed aliphatic hydrocarbon ring; which process comprises reacting in the absence of water at temperatures of about $-100$ C. to $+100$ C., in the presence of a protective gas
(1) at least one water-free compound of a transition metal from the group consisting of Groups IVb, Vb, VIb and Group VIII of the Periodic Table with
(2) at least one allyl compound of a second metal selected from the group consisting of metals of Groups Ia, IIa, IIb and IIIa.

2. Process as claimed in claim 1, wherein said transition metal is at least one member selected from the group consisting of titanium, vanadium, chromium, iron, cobalt, zirconium, niobium, molybdenum, palladium, tantalum, platinum, tungsten and thorium.

3. Process as claimed in claim 1, wherein said second metal is at least one member selected from the group consisting of alkali metals, alkaline earth metals, boron, aluminum, mercury and zinc.

4. Process as claimed in claim 1, wherein said second metal is magnesium.

5. Process as claimed in claim 1, wherein said $R_1$ to $R_5$ are each selected from the group consisting of hydrogen, methyl, phenyl, n-pentyl, cyclohexyl, and where $R_1$ and $R_4$ are part of a closed ring, said $R_1$ and $R_4$ having the formula $$(CH_2)_n$$

wherein n is a whole number from 1 to 9.

6. Process as claimed in claim 1, where said π-allyl moieties are the sole substituents on said transition metal product.

7. Process as claimed in claim 2, wherein said reactant (1) is a transition metal compound of at least one member selected from the group consisting of halides and acetylacetonates.

8. Process as claimed in claim 4, wherein said reactant (2) is allyl magnesium chloride.

9. Process as claimed in claim 1, carried out in a liquid reaction medium which is substantially inert with respect to said reactants and said reaction products under conditions of reaction.

10. Process as claimed in claim 1, wherein said reactant (2) is prepared in situ.

11. Process as claimed in claim 2, wherein $R_1$ to $R_5$ are the same.

12. Process as claimed in claim 1, wherein said $\pi$-allyl transition metal product contains two $\pi$-allyl groups therein.

13. $\pi$-Allyl transition metal compounds of the formula

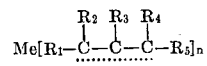

wherein Me is a transition metal selected from the group consisting of metals of Groups IV$b$, V$b$, VI$b$ and group VIII of the Periodic Table; $n$ is 2 to 4 and $R_1$ to $R_5$ are different or the same and are each a substituent selected from the group consisting of hydrogen, alkyl, cycloalkyl-, aralkyl- and aryl radicals and $R_1$ and $R_4$ together with said $\pi$-allyl group can form a closed aliphatic hydrocarbon ring, provided that where Me is nickel at least one of said $R_1$ to $R_5$ is a hydrocarbon substituent.

14. Compounds as claimed in claim 13, wherein said transition metal is a member of the group consisting of titanium, vanadium, chromium, iron, cobalt, zirconium, niobium, molybdenum, palladium, tantalum, platinum, tungsten and thorium.

15. The compounds claimed in claim 13, wherein said Group VIII metal is at least one member selected from the group consisting of iron, cobalt, palladium, and platinum.

16. Compounds as claimed in claim 13, wherein said alkyl is selected from the group consisting of methyl, and n-pentyl, cycloalkyl is cyclohexyl, aryl is phenyl, and said aliphatic hydrocarbon ring has about 4 to 12 carbon atoms therein.

17. Compounds as claimed in claim 13, wherein said $R_1$ and $R_4$ taken together are sec-penten-4-ylidene.

18. Compounds as claimed in claim 13, wherein said Group IV$b$ metal is selected from the group consisting of titanium and zirconium; said Group V$b$ metal is vanadium; and said Group VI$b$ metal is selected from the group consisting of chromium, molybdenum and tungsten.

19. Compounds as claimed in claim 13, wherein said allyl moiety is at least one member of the group consisting of allyl, methallyl, crotyl, cinnamyl, pinenyl, triphenyl cyclopropenyl, hexenyl, cyclooctenyl, cyclooctatrienyl, cyclododecatrienyl, cyclobutenyl, dodecatrienyl, octadienyl and cyclohexenyl.

20. Oligomers having as their repeating mer-units at least one compound as claimed in claim 13.

References Cited

UNITED STATES PATENTS

| | | | |
|---|---|---|---|
| 3,086,984 | 4/1963 | Dubeck | 260—439 |
| 3,117,148 | 1/1964 | Ihrman | 260—439 |
| 3,159,658 | 12/1964 | Fischer et al. | 260—429 |

OTHER REFERENCES

Smiot et al.: Angew Chem. 71 (1959) p. 284.
Wilke et al.: Angew Chem. 73 (1961) p. 755–6.
Wilke et al.: Angew Chem. 73 (1961) p. 756.
Chien et al.: Chem. and Industry (London) 1961 p. 745.
Jones et al.: Tetrahedron Letters No. 2 (1961) p. 48–50.
Fisher et al.: Z. Naturforschg 16b (1961) p. 77–8.

HELEN M. McCARTHY, *Primary Examiner.*

A. P. DEMERS, *Assistant Examiner.*

U.S. Cl. X.R.

252—431; 260—429.3, 429.5, 438.5, 439, 666

UNITED STATES PATENT OFFICE
CERTIFICATE OF CORRECTION

Patent No. 3,432,530                                                  March 11, 1969

Günther Wilke

It is certified that error appears in the above identified patent and that said Letters Patent are hereby corrected as shown below:

Column 6, line 53, "$(3_3H_5)_4W$" should read -- $(C_3H_5)_4W$ --; line 68, "300 cm.$_3$" should read -- 300 cm$^3$ --. Column 7, line 45, "$\Pi=Nb(C_3H_5)_4$" should read -- $\Pi-Nb(C_3H_5)_4$ --. Column 9, line 54, "$\Pi-(C_3H_5)_3Cr+1_2\Pi(C_3H_5)_2$" should read -- $\Pi-(C_3H_5)_3Cr+1_2 \longrightarrow \Pi(C_3H_5)_2$ --. Column 13, lines 30 to 36, the upper right-hand portion of the formula should appear as shown below:

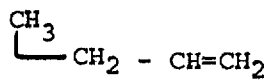

Column 16, line 1, "Ni, 36,04%" should read -- Nickel 26.04% --; line 44, "$(\Pi-C_3H-NiI \cdot P(C_6H_5)_3/$" should read -- $(\Pi-C_3H_5NiI \cdot P(C_6H_5)_3)$. --.

Signed and sealed this 7th day of April 1970.

(SEAL)
Attest:

EDWARD M. FLETCHER, JR.                                    WILLIAM E. SCHUYLER, JR.
Attesting Officer                                                       Commissioner of Patents